Dec. 15, 1942. F. W. COFFING Re. 22,237

FREE-CHAIN PLANETARY HOIST

Original Filed Oct. 8, 1937 4 Sheets-Sheet 1

INVENTOR.
FREDRICK W. COFFING.
BY
Lockwood Goldsmith & Galt
ATTORNEYS.

Dec. 15, 1942. F. W. COFFING Re. 22,237
FREE-CHAIN PLANETARY HOIST
Original Filed Oct. 8, 1937 4 Sheets-Sheet 2
FIG. 3
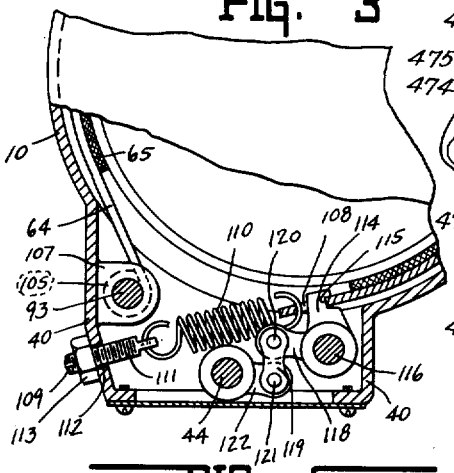
FIG. 10
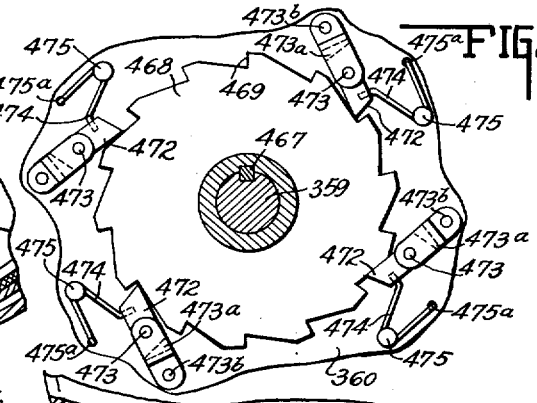
FIG. 5
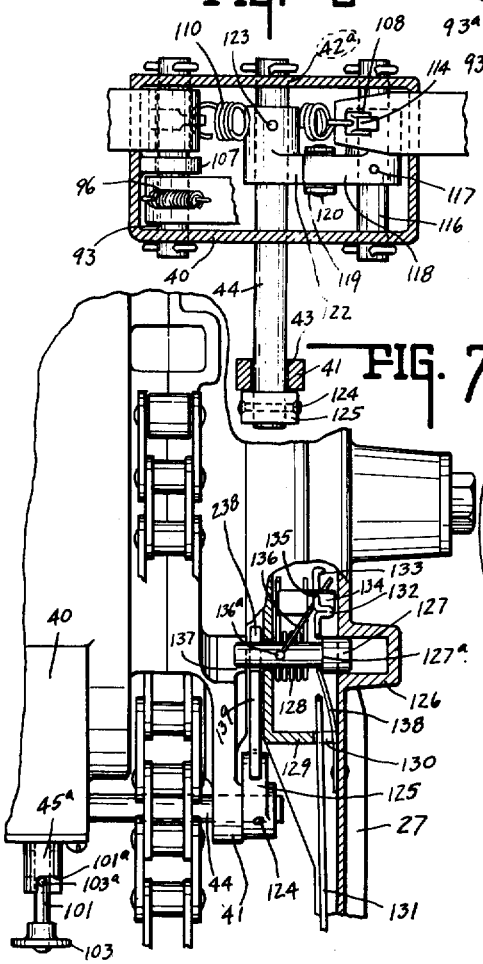
FIG. 4
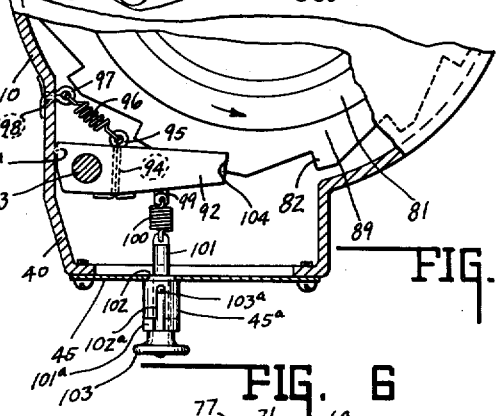
FIG. 6
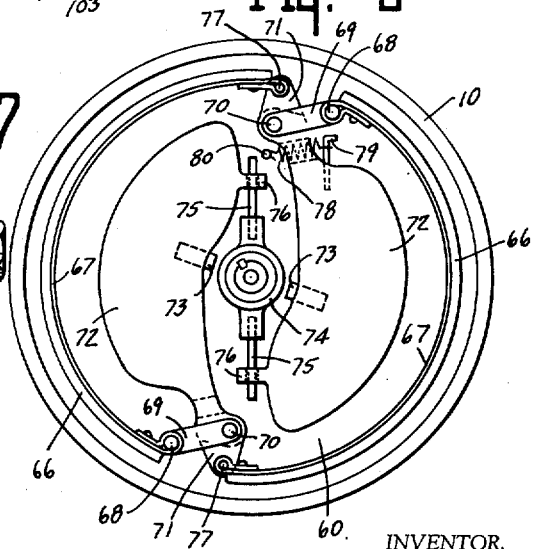
FIG. 7
INVENTOR.
FREDRICK W. COFFING.
BY
Lockwood Goldsmith & Galt
ATTORNEYS.

Dec. 15, 1942. F. W. COFFING Re. 22,237

FREE-CHAIN PLANETARY HOIST

Original Filed Oct. 8, 1937 4 Sheets-Sheet 3

INVENTOR.
FREDRICK W. COFFING.
BY
Lockwood Goldsmith & Galt
ATTORNEYS.

Dec. 15, 1942. F. W. COFFING Re. 22,237

FREE-CHAIN PLANETARY HOIST

Original Filed Oct. 8, 1937 4 Sheets-Sheet 4

INVENTOR.
FREDRICK W. COFFING.
BY Lockwood Goldsmith & Galt
ATTORNEYS.

Reissued Dec. 15, 1942 Re. 22,237

UNITED STATES PATENT OFFICE 22,237

FREE-CHAIN PLANETARY HOIST

Fredrick W. Coffing, Danville, Ill.

Original No. 2,269,438, dated January 13, 1942, Serial No. 167,959, October 8, 1937. Application for reissue March 6, 1942, Serial No. 433,680. In Great Britain September 8, 1937

17 Claims. (Cl. 254—171)

This invention relates to a chain or like hoist capable of free-chain action, embodying a planetary type mechanism, a brake mechanism, a speed control or governor mechanism and which is hand operable for load elevating and lowering and hand controlled.

This invention is a radical improvement upon certain prior patented structures such as illustrated in the prior Patents No. 1,862,331 dated June 7, 1932; No. 1,937,331 dated November 2, 1933; No. 1,973,844 dated September 18, 1934; No. 1,999,036 dated April 23, 1935; and No. 2,044,565 dated June 16, 1936, and the pending application Serial No. 755,259 filed November 30, 1934, entitled "Free-chain hoist," allowed February 25, 1937, now Patent No. 2,099,676 dated November 23, 1937.

This invention also is an improvement upon that disclosed in the pending application Serial No. 49,919, filed November 15, 1935, entitled "Free-chain planetary hoist," now Patent No. 2,150,419 dated March 14, 1939.

This invention includes the basic features of a brake mechanism, a speed control or governor mechanism, and a planetary mechanism.

The chief object of the invention is to produce a hoist which will have a highly desirable safety factor arrangement and which is capable of free-chain action, when desired, in either direction.

Another object of the invention is to produce a load hoisting structure having parts capable of selective association to vary the speed and capacity thereof as hereinafter set forth.

The chief feature of the invention is the hoist which is capable of accomplishing the chief object.

The full nature of the invention will be understood from the accompanying drawings and the following description and claims.

In the drawings

Fig. 3 is an elevational view of the immediate brake operating and control mechanism, parts being broken away to show the same in section and to illustrate other portions of the same and other parts more fully.

Fig. 4 is a similar view of the selective manual control for the planetary clutch arrangement, whereby free-chain lowering without the load is possible.

Fig. 5 is a transverse sectional view of the extended portion of the housing associated with the parts illustrated in Figs. 3 and 4.

Fig. 6 is an elevational view of the governor or speed control mechanism.

Fig. 7 is a side elevational view of a portion of the hoist, a portion of the handle being broken away and sectioned to show other portions thereof in greater detail, the brake actuating handle member being shown in non-actuating position.

Fig. 10 is a sectional view taken on line 13—13 of Fig. 8 and in the direction of the arrows and of the one-way clutch shown therein.

Figures 1, 2:
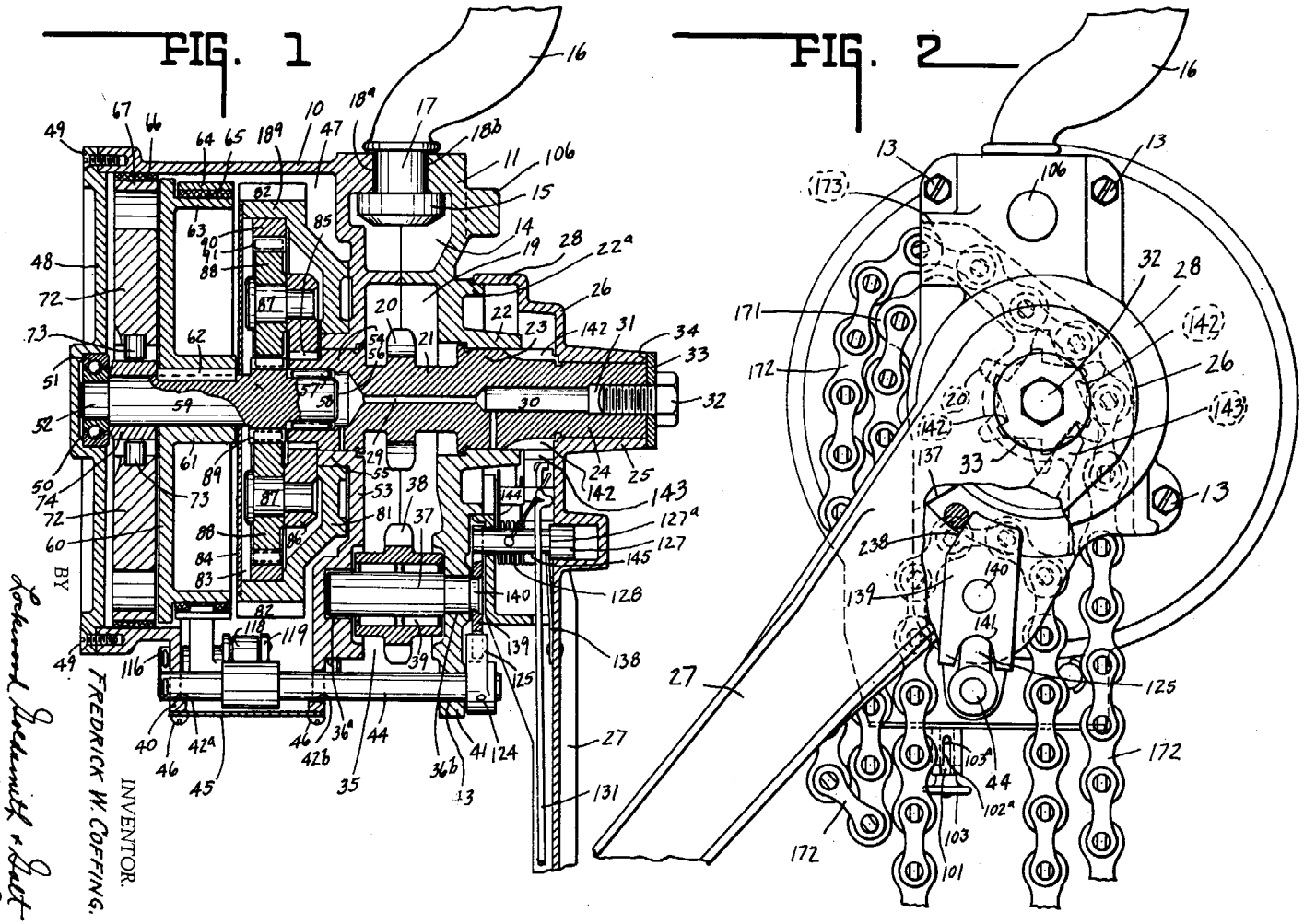
Fig. 1 is a central sectional view through a hoist embodying the present invention, the load chain being omitted and extreme ends of the supporting hook and operating handle being omitted for clearness, a member of the latter being shown in position to actuate the brake mechanism.
Fig. 2 is a side elevational view looking at the handle end of the hoist, parts of the supporting hook and the handle being omitted and other parts of the handle mechanism being broken away to show the same in section and to illustrate other parts more fully, dotted lines indicating the chain passage, sprockets and chain portions.

In Figs. 1 to 7 of the drawings, 10 indicates one portion of a housing, and 11 a complementary cover forming portion thereof. The two are suitably secured together as at 13. The two form a chamber 14 for receiving the head 15 of a supporting hook 16 having the cylindrical portion 17 swiveled in the bearing 18*a* and 18*b*.

The two portions 10 and 11 of the housing and cover also provide a chamber 19 in which is mounted a load chain engaging sprocket 20 carried by the shaft 21 and herein the two are shown integral. The cover portion 11 has an outwardly directed hub portion 22 which rotatably supports the portion 23 of the shaft 21. The shaft is further extended at 24 and rotatably supports the hub portion 25 of the body portion 26 of the handle structure having the extended portion 27. The body portion 26 of the handle is extended toward the cover as at 28 and telescopes, as it were the adjacent portion 22*a* of the cover, as shown clearly in the upper right hand portion of Fig. 1.

The shaft portion 21—see Fig. 1—as well as portions 23 and 24 are provided with aligned and communicating lubricant receiving passages 29, 30 and 31, respectively, the latter being threaded to receive a closure in the form of a cap screw 32 bearing on a washer 33 that engages the outer end 34 of the hub portion 25 of the handle. By this means the handle is not only detachably associated with the hoist structure but lubricant may also be supplied to the interior mechanism to which reference will be had hereinafter, which mechanism includes a planetary system.

The lower part of chamber 19 is open as at 35. In aligned bearings 36a and 36b formed in housing 10, and cover and housing 11, respectively, is mounted a shaft 37 which rotatably supports an intermediate sprocket or gear 38, there being interposed therebetween an anti-friction construction in the form of rollers and the like 39. The purpose of this intermediate sprocket or gear will be hereinafter set forth.

The housing 10 includes a depending well portion 40 while the cover 11 includes a depending portion 41. The aligned apertures 42a and 42b in the well portion and 43 in the depending portion 41, rotatably support a shaft 44. The cover plate 45 is suitably secured as at 46 to the well portion 40 and closes the same.

The housing 10 includes a chamber 47 which is closed by a cover plate 48 suitably secured to the housing as at 49 and said cover plate 48 is recessed as at 50 to provide a closed bearing which receives an anti-friction structure 51 in the form of a ball race, or the like, for rotatably supporting the shaft portion 52. As previously set forth, shaft portion 23 is rotatably supported in the hub portion 22 of the cover and housing member 11. The shaft portion 21 which projects through the partition portion 53 of the housing 10 is enlarged as at 54 and is rotatably supported by the inwardly directed hub portion 55 on partition 53. This hub portion 55 constitutes the rotatable support for the primary shaft 21 with which is associated the handle structure, previously briefly mentioned.

The extended end 54 of this primary shaft—see Fig. 1—is recessed at 56 and receives the end 58 of the shaft 59, the two shafts being rotatably associated together by the anti-friction structure, such as the rollers 57. This shaft 52, 58, 59 is the supplementary shaft and with it is associated the planetary transmission, brake mechanism and the speed control or governor mechanism hereinafter described.

A plate 60—see Fig. 1—has a hub portion 61 keyed as at 62 or otherwise suitably secured to the supplementary or secondary shaft 59. Concentric therewith and integral with plate 60, is a brake drum structure 63. Operatively associated therewith is a brake band 64 provided with brake lining 65, or the equivalent. Reference will be had hereinafter to the brake operating structure per se, although it is to be understood the brake band substantially encircles the brake drum—see Fig. 3.

At the extreme left hand portion of Fig. 1 is illustrated the speed control and the same is more fully illustrated in Fig. 6. In said figure 66 indicates a suitable friction lining, or the like, carried by the shoe portions 67, each of which has one end connected at 68 to a link 69 pivotally connected at 70 to the plate 60. An arm 71 also is pivotally connected as at 70 to the plate 60.

The arm 71—see Fig. 6—includes an enlarged or weighted portion 72 that mounts a bumper 73 adapted to engage the collar portion 74 of an aligning device having the rod portion 75 slidably associated with the lug portion 76 on the weight 72. The opposite end of each shoe portion 67 is pivotally connected as at 77 to the free end of the other lever arm 71 and counterweight 72. If desired, one or more springs 78 may be associated with the weighted arms as at 79 and anchored to the plate portion 60 as at 80. Substantially the same form of centrifugal operable speed control is illustrated in Fig. 5 of application Serial No. 49,919. For a more complete description of the operation of the same per se reference is made thereto.

Rotatably supported on the hub portion 55 of the partition portion 53 of the housing 10—see Fig. 1—is the external planetary gear housing 81 having external ratchet teeth 82 offset toward the left relative to the central support. This offset arrangement forms a chamber 83 closed by a press-fitted or otherwise suitably secured plate 84, the shaft 59 extending therethrough. Thus, lubricant supplied to the chamber 83 through the other and primary shaft 21—23—24 does not enter the chamber 47 except chamber portion 83 thereof enclosed within and formed by the cover 84 and the planetary member 81.

The extreme left hand and exposed end of shaft 21 (portion 54)—see Fig. 1—is provided with a plurality of keyways, four in number, of which two are shown, receiving keys 85 that key the pinion support plate 86 to the handle operable shaft 21. Plate 86 supports the pinion shafts 87, each of which rotatably supports a pinion gear 88. Press fitted or otherwise secured to the interior of portion 189 of the exterior or ratchet portion planetary member 81, is the internal ring gear structure 90 having the teeth 91 which mesh with the pinion gears 88. If desired, the teeth 91 may be formed directly upon the interior of portion 189. In the rotation of shaft 21 (handle operable) for load elevating the pinions revolve about the shaft 59 having sun gear teeth 89 thereon. In such revolution of the pinion gears 88, the shaft 59, the speed control device and the brake structure do not rotate with the handle operable shaft 21, for the ratchet teeth 82 on housing 81 is arranged to always permit housing 81 to rotate with the shaft 21—23—24 in the load elevating direction.

The foregoing also is sufficient for an understanding of free-chain movement in the load elevating direction when such movement is desired when there is no load on load chain 172.

The means for holding planetary member 81—189 against rotation in one direction and permitting normal rotation in the opposite direction is shown clearly in Fig. 4. The locking dog or pawl 92 is supported on the shaft 93 carried at opposite ends by the well portion 40 of housing 10. The dog is apertured as at 94 and a cotter key or like connection 95 is mounted therein and anchors one end of spring 96 anchored by a cotter key 97 or an equivalent device, as at 98 to the housing 10 or the well portion 40 thereof. This spring structure normally retains the dog 92 in contact with the ratchet teeth 82 and permits the ratchet to rotate counterclockwise, as shown in Fig. 4, but constrains dog 92 to prevent reverse rotation of the ratchet, as shown in the same figure, unless the dog is withdrawn from ratchet engagement which is accomplished as follows:

The dog 92 includes a spring support 99 with which is associated a spring 100. The other end thereof is carried by a pull rod 101 that extends through aperture 102 in cover plate 45 of the well portion 40. Said rod terminates in a finger piece 103.

It will be noted the draft, as indicated at 104, see Fig. 4, on the dog is such that the greater the tendency to rotate clockwise, the greater will be the locking effort exerted by the dog. The dog is prevented from dropping out of tooth engagement by spring 96. When finger piece 103 is pulled outwardly or downwardly, spring 100 elongates, but the dog 92 is not released until the ratchet wheel has rotated counterclockwise sufficiently to clear the associated ratchet tooth 82 from the pawl draft. Thereupon, spring 96 elongates and spring 100 releases the dog from the ratchet.

To maintain the dog 92 out of ratchet engagement, rod 101—see Fig. 4—carries pin 103a having ends normally slidable in slots 102a in the tube 45a carried by cover 45. The end of this tube 45a also is notched transversely as at 101a. When pin 103a is seated therein, pawl or dog 92 is held out of ratchet engagement. When released, the pin nests in slots 102a and spring 100 tends to hold same nested and spring 96 functions to restore the locking dog 92 to operative engagement with the ratchet.

If in the load elevating movement, there should occur a slight reverse movement of ratchet teeth 82, portion 93a of pawl immediately engages the adjacent surface of well 40, and prevents pawl tilting in a counterclockwise direction—see Fig. 4.

The combined planetary ratchet wheel when free from the dog, may rotate in either direction whereas previously it was free to rotate only in a counterclockwise direction.

Reference will now be had to Figs. 3 and 5, wherein the operating and supporting mechanisms of the brake structure are more specifically illustrated. The brake band 64, carrying the lining 65, if desired, has one end 105 encircling shaft 93 supported by the well 40 and by the interminate ear 107 rigid therewith—see Fig. 5. Any other desired form of brake band anchorage may be employed.

The other end of the brake band includes an elongated aperture 108. One curled end of the spring 110 is associated with the aperture. The opposite curled end of spring 110 is secured to the apertured end of a threaded member 111 having the externally exposed tool engageable portion 109 and having threaded engagement with the threaded aperture 112 in the well portion 40. The tension exerted by the brake band in normal operation is adjusted by member 111 and such adjustment is retained by the nut 113 threaded on member 111 and bearing upon the well surface.

An arm 114, see Fig. 3, projects into the aperture 108 and is notched as at 115 and is carried by shaft 116 supported by opposite sides of the well structure 40, as shown in Fig. 5. Brake arm 114 is one arm of a bell crank pinned as at 117 to the shaft 116, the other arm 118 thereof being pivotally associated with a pair of links 119 at 120. The opposite ends of said links are pivotally associated at 121 with arm or lever member 122 pinned or otherwise secured as at 123—see Fig. 5—to the shaft 44 which, as before stated, is supported by the two depending walls of the well portion 40 and by the depending portion 41 of the cover and housing member 11. This shaft 44 projects through the portion 41 and on its projecting or extended end has secured to it, as by pinning 124 or the like, a lever arm 125—see Figs. 2, 5 and 7. The latter figure also shows rod 101 retained in ratchet dog locking-out position.

The handle 27—see Figs. 1 and 7—includes an offset recessed portion 126 which slidably supports a laterally projecting bolt 127 normally projected toward the hoist body by spring 128, as hereinafter set forth. The handle supports a cover portion 129 apertured at 130 for the manual control rod 131, which is reciprocated longitudinally of the handle. Rod 131 has the offset portion 132 and the end 133.

An angular and stiff spring member 134 is carried by a power pawl, hereinafter to be described, and the spring has its free end apertured as at 135 to receive the end 133, the angular portion of the latter and the offset portion permitting relative movement of the power pawl without interference from the rod 131. When, however, the rod 131 is actuated so as to cause the same to move upwardly, having reference to Fig. 7, the offset portion 132 engages the angular member 134 and the wire member 136 slidably associated therewith and which is pivotally associated as at 136a with the bolt 127, causes the bolt 127 to be retracted so that it moves toward the right in Fig. 7. This movement retracts the bolt 127 so that the exposed end of the bolt no longer extends outwardly a sufficient distance to engage a stop surface 137, see Fig. 2, on the cover portion of the hoist.

The flat spring 138—see Fig. 1—carried by the handle bears on the shouldered portion 127a of the bolt 127 and further retracts the bolt so that it clears the ledge and stop portion 137 and is in position to engage the inclined portion 238—see Fig. 2—of the member 139 pivoted on an extension 140 of the shaft 37 that mounts the idler sprocket 38—see Fig. 1. The opposite end of the member 139 is recessed as at 141 and straddles, as it were, the lever arm 125 which is the brake actuating arm. Thus, in the normal operation of the handle, which can move from the position shown in Fig. 2 counterclockwise until the handle engages the stop 106 on the cover portion, the bolt member 127—see Fig. 1—is ineffective for actuation. However, after the bolt member 127 engages the stop 137 on the cover portion, further movement in the load elevating direction is impossible. The brake mechanism is arranged so that it will only function for load lowering when it is actuated by means of the bolt 127 clearing the stop 137 and tilting the lever 139 for tilting the shaft 44 through portion 125, which releases the brake mechanism through lever 114—118—see Fig. 3.

The handle structure herein disclosed is similar to the handle structure shown in Patent No. 1,937,331—see Figs. 4 to 6 thereof. Rod 131—see Fig. 1—herein is similar to rod 35—135 shown in said patent, except in this instance, the end of rod 131 is offset. Member 136 herein is similar to member 91 of the patent. Plate 34 of said patent disclosure is similar to plate 134 shown herein—see Fig. 7. Spring 128 is the equivalent of spring 32 of said patent and has a similar function in that it constrains the power pawl 143, pivotally supported by the handle, toward engagement with the ratchet teeth 142—see Fig. 1. In the present instance, these ratchet teeth on the shaft 21 are designated by the numeral 142. In the patent, the ratchet teeth are designated by the numeral 28 and are a part of the shaft 16. The function of the power pawl 143 carried by the handle 27 is substantially the same as that of the power pawl 31 shown and described in Patent No. 1,937,331.

The spring 128 actuates this pawl indicated in

Fig. 1 by the numeral 143 and carrying the portion 144, pivotally supported as at 145, is substantially the same as the pawl 31 carrying the stop 59 and pivotally supported at 30, illustrated in Fig. 5 of said patent. However, in the present instance, spring 138 normally constrains the plunger member 127 toward its seated position and thereby differentiates from the spring 84 shown in Fig. 4 of the before mentioned patent, which is constrained in the opposite direction. In other words, spring 128 in this instance, has the same function that the finger piece 81 has in the aforesaid basic patent disclosure. By reason of this simplification, the shoulder 85 and the curved portion 131 of the pawl of the patent are not required. The mechanism for reciprocating the rod 131 and carried by the handle near the free end thereof is substantially that shown in the broken away portion immediately and to the left in Fig. 4 of Patent No. 1,937,331, and is not duplicated herein, although it or equivalent mechanism is comprehended within the present invention.

The load chain 172 in Fig. 2 is shown having one end and the surplus end secured to the boss 171 on the housing. The chain 172 for load lowering passes inwardly into the opening 173 forming the communication to the chamber 19. The chain then engages the sprocket 20 and then passes downwardly and outwardly, as shown immediately to the right in Fig. 2. This is the simple or single-line chain operation.

From the foregoing, referring to the hoist operation per se, as previously pointed out, the chain 172, when relieved from load, may be pulled through the hoist in the load elevating direction as a free-chain structure and the handle may remain stationary. For load elevating, reciprocation of the handle causes rotation of the load or power sprocket 20 and as before stated—see Fig. 1—during this operation the brake mechanism and the governor mechanism remain stationary.

In order to lower the load, the rod 131 is actuated and the handle tilted further to tilt lever 139—see Fig. 2—which releases the brake to the desired degree, dependent upon the amount of tilting of member 139. Thus, the operator has control of load lowering. Should the speed of lowering, due to the operator's ignorance or carelessness, exceed that for which the hoist is adjusted for safety, the governor structure automatically becomes operable and the counterweights—see Fig. 6—cause the shoes to engage the adjacent braking portion of the hoist to retard the rate of lowering to that for which the centrifugal governor is adjusted.

In this load lowering the pawl 92—see Fig. 4—due to the reversal of the rotation of the ratchet wheel, engages one of the teeth thereof and does not ratchet relative to the wheel, and, therefore, holds the planetary housing 81 so that the pinion gears rotate within and revolve around in the ring gear 91 which causes the brake supporting shaft and the governor supporting shaft to rotate through the planetary system. Therefore, in load lowering under load and controlled through the handle, the brake mechanism and the governor mechanism rotate at a greater speed than the load chain sprocket rotates, although proportional thereto, which insures better or more positive operation of the brake mechanism and governor mechanism.

Whenever it is desired to obtain free chain movement in the load lowering direction and without load on the chain, for the reasons hereinafter set forth, the rod 101—see Figs. 2, 4 and 7—is pulled outwardly and if it is not desired to hold it outwardly manually, the rod is turned a quarter turn and the pin 103*a* is seated in the notches 101*a*—see Figs. 7 and 4—which holds the spring 100 extended and pawl 92 out of ratchet engagement.

If there be load on the chain, the locking dog 92 will not release from the ratchet due to the draft before mentioned—see Fig. 4. Reverse rotation of the ratchet, therefore, is required but only to a sufficient degree to clear the draft interlock on the pawl and when that clearance is effected, the pawl 92 is released by its spring 100 in opposition to spring 96 and is withdrawn and held out of ratchet tooth engagement. Then the chain may be operated as a free-chain in the load lowering direction. In this free-chain movement, the brake mechanism is stationary and, therefore, the governor structure is not operable and the sun gear accordingly remains stationary so that the pinions and the ring gear rotate with the load or power sprocket.

The load may be held in suspended relation by the handle being moved into position so that the plunger 127 does not engage the lever 139 which actuates the brake and the brake mechanism thus is retained in braking position, and the handle is prevented from being rotated in a direction opposite to the load elevating direction because the pawl 92 engages the ratchet and holds the ratchet stationary. Dropping of the load cannot be accidentally effected as long as there is weight or load on the chain because of the draft 104 on the pawl 92. The chain without load only can be dropped intentionally by releasing the pawl 92 as aforesaid and operating the handle 27 to free its pawl from its draft lock. Thereupon the chain will escape and drop, and the handle, if moved at all, will only swing upwardly in a counterclockwise direction until it engages the stop 106.

Figures 8, 9:
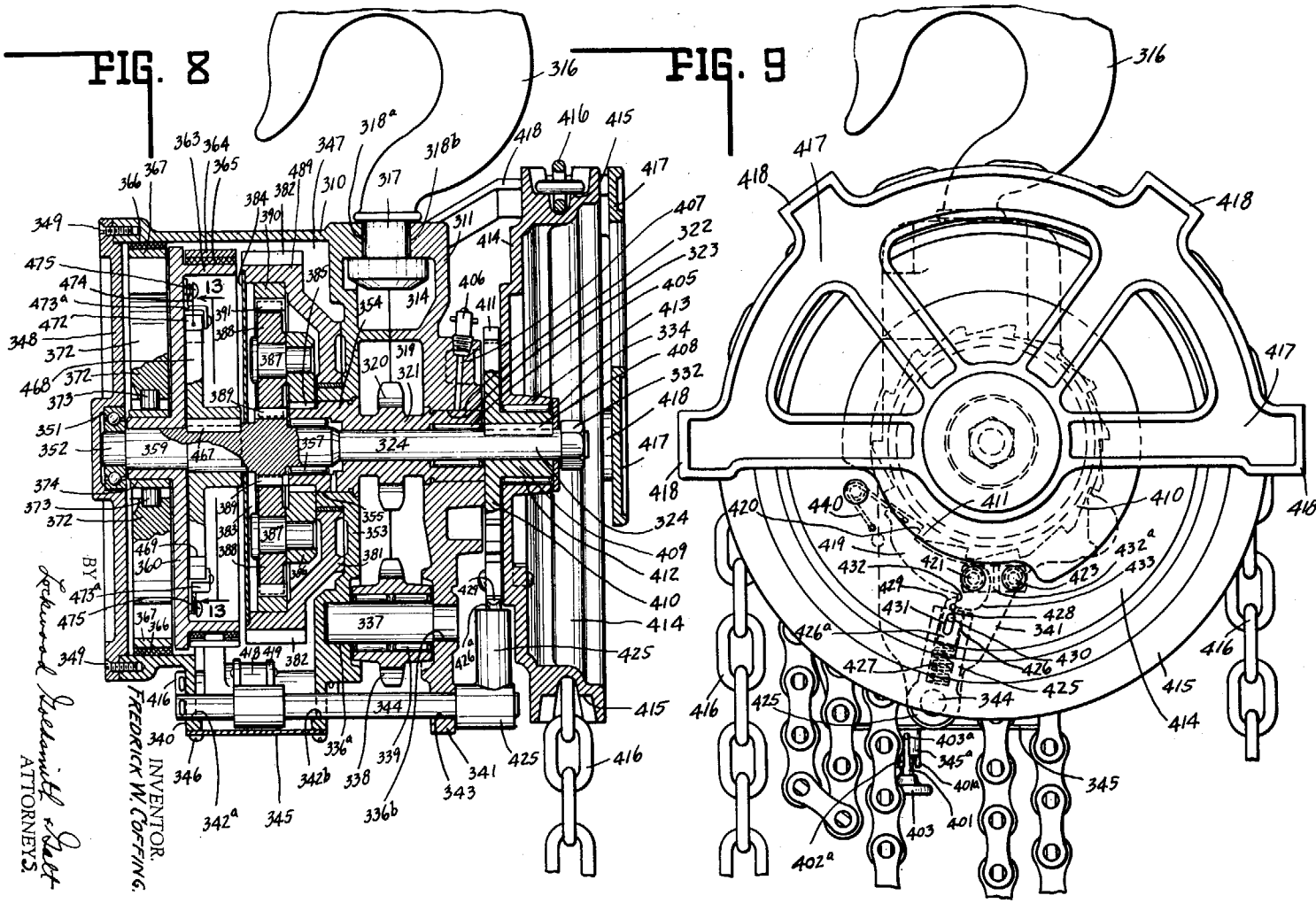
Fig. 8 is a central sectional view of another form of the present invention.
Fig. 9 is a side elevation thereof.

In the form of the invention illustrated in Figs. 8 and 9, numerals of the three hundred series indicate parts identical with or similar to those of the primary series illustrated in Figs. 1 to 7 inclusive. Numerals of the four hundred series have been utilized without regard to the primary series of numerals.

This form of the invention incorporates a chain and wheel as a source of power in place of the ratchet operating lever handle type shown in Figs. 1 to 7, and a chain guard. In Figs. 8 and 9 the power is applied to the load chain sprocket through the planetary system in a manner broadly similar to that illustrated in application Serial No. 49,919. The present form of the invention includes the governor or speed control structure as well as the braking structure, both, however, operative relative to the load chain through the planetary system. The braking structure and planetary release mechanism is similar to that illustrated in the first illustrated form of the invention, but operable by means associated with the chain power wheel dissimilar to that of the handle lever associated means shown herein.

In the present form of the invention, load sprocket 320 is rigid with shaft 321 within which is mounted shaft 324 in turn rigid with shaft portion 359. The braking structure includes drum 363 and plate 360 rotatably mounted on shaft 359. A one-way clutch structure locks the plate 360 to the shaft 359—324 in load lowering movement but permits, without such locking, free rotation of said shaft 359 in load elevating direction as follows:

Similar to the disclosure in Figs. 2 and 4 of application Serial No. 49,919, Figs. 8 and 10 herein disclose a ratchet 468 rigid with shaft 359 by the key 467 and having teeth 469 engaged by pawls or dogs 472 pivoted at 473 on the inside face of plate 360 and angle brackets 473a secured to plate 360 at 473b. Springs 474 secured at 475 and 475a to the plate 360 normally constrain dogs 472 into ratchet tooth engagement and permit relative rotation in load elevating direction but prevent relative rotation in the load lowering direction.

As disclosed in Fig. 10 and the last mentioned application, a plurality of pairs of pawls are provided and the spacing between adjacent pawls of different pairs is unequal for the purpose mentioned in said application.

Shaft 359 has teeth 389 constituting the sun gear meshing with pinions 388 rotatable on trunnions 387 carried by plate 386 keyed as at 385 to shaft 321. When the ring gear 390 is held against rotation by the holding pawl (similar to pawl 92 in Fig. 4) engaging ratchet teeth 382 of member 381, load gear 320 is rotated through the planetary system for load elevation. This arrangement, while operating to elevate loads at a slower rate than the first form of the present invention, is capable of elevating greater loads for the same effort applied to the shaft 324 as is applied to shaft 24.

In this form of the invention the braking structure and governor structure are normally ineffective during load elevation, but are effective for load holding and/or in load lowering.

Portion 354 of shaft 321, see Fig. 8, is rotatably supported on shaft 324 by rollers 357 at one end and by rollers 405 at the other end. Shaft 321 is also rotatable at one end in bearing 355 of partition plate 353 and in bore 322 of housing 311 at 323. An "Alemite" lubricator 406 is associated with passage 407 to supply lubrication.

Keyed as at 408 to the exposed end of shaft 324 is hub 409 of a ratchet 410 having teeth 411. Washer 334 and nut 332 retain the ratchet on the shaft 324. Encircling hub 409 are rollers 412 supporting hub 413 of the chain wheel 414 having the chain groove periphery 415. Seated therein is the transverse link endless chain 416 retained therein and on the wheel by chain guard 417—see Fig. 9—having arms 418 rigid with housing 311.

A pawl 419—see Fig. 9—having tooth 420 is pivoted at 421 in bracket 432a secured at 423 to the wheel 414. In counterclockwise or load elevating rotation of wheel 414, the tooth 420 engages the adjacent ratchet tooth 411 of ratchet 410 so that shaft 324 rotates to transmit power through the planetary system to the load chain sprocket 320 to elevate the load. The ratchet clutch shown in Fig. 10 permits such movement without brake release or governor action. The pawl associated with the planetary gear housing ratchet teeth 382 has its usual function at this period of operation. It is not specifically illustrated herein because it is similar to pawl 92 shown in Fig. 4. The brake control mechanism—see Fig. 9—is associated therewith in a similar manner and herein control parts 401a, 401, 402a, 403 and 403a are similar to the corresponding one hundred series numbered parts shown in Figs. 3, 4 and 7. Member 101—103 controls this pawl, not shown, but associated with ratchet 382.

Shaft 344—see Fig. 8—is the brake control shaft similar to shaft 44 shown in Figs. 1, 2, 3, 5 and 7, and on its free end is mounted the hub of arm 425. Arm 425 is recessed at 426. A plunger 426a—see Fig. 9—is slidable therein and is projected outwardly by spring 427 also seated in socket or recess 426. Plunger 426a includes a tooth portion 428 with relieved face 429. A pin 430 is secured to plunger 426a and rides in slot 431 in arm 425.

Pawl 419—see Fig. 9—includes a tooth 432 and an approach cam face 433. In the load elevating movement (counterclockwise rotation) of wheel 414 the pawl 419 has its cam face 433 engage relieved face 429 of plunger 426a and depresses the latter without rocking lever arm 425. Spring 118, see Fig. 3, normally constrains shaft 44 and arm 125 toward the right—see Fig. 2. Arm 425 in a similar manner is constrained toward the position shown in Fig. 9.

When it is desired to hold the load in elevated position, all parts are positioned as shown. When it is desired to lower the load, wheel 414 is reversed until tooth 432 engages tooth 428. Continued reverse rotation thereupon tilts arm 425 counterclockwise to rock shaft 344 to release the brake mechanism to the desired degree dependent upon the amount of reverse rotation. When brake release is effected, the speed control, naturally automatically becomes effective and prevents load dropping should brake failure occur. Of course, if there is disengagement between member 419 and 426a the brake mechanism immediately is effective for braking.

A spring 440 carried by the wheel 414—see Fig. 9—normally constrains pawl 419 into ratchet engagement. In the reverse rotation of the wheel 414 for brake release, if the load is positioned immediately adjacent the hoist, the power ratchet and pawl connection permits the load to remain stationary while the wheel is reversely rotated to cause pawl 419 to engage plunger 426a.

Figures 11, 12:
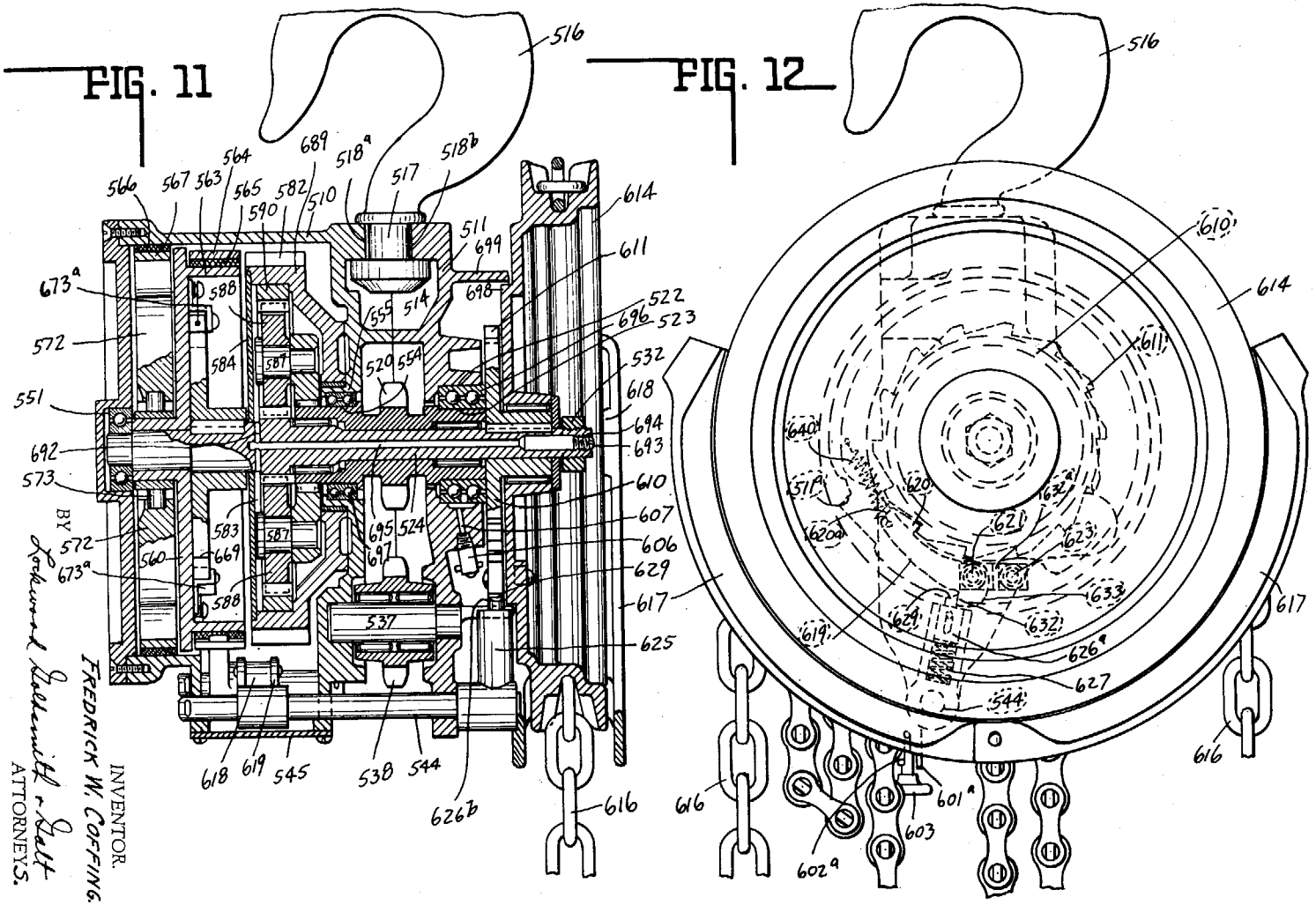
Fig. 11 is a central sectional view of another form of the invention and similar to that shown in Figs. 8 to 10, inclusive.
Fig. 12 is a side elevation thereof.

In Figs. 11 and 12 there is illustrated an improved and safer form of the invention illustrated in Figs. 8 to 10, inclusive. Numerals of the five and six hundred series indicate parts identical or similar to those illustrated in Figs. 8 to 10 by numerals of the three and four hundred series, respectively.

Since the brake mechanism, speed control mechanism, planetary mechanism, immediate brake releasing mechanism, one-way ratchet clutch mechanism, combination ratchet and ring gear mechanism, and power applying mechanism herein are substantially identical to that illustrated in Figs. 8 to 10, no further description thereof is believed necessary.

The present form of the invention shows the "Alemite" fitting 606 and supply passage 607 positioned opposite that shown in Fig. 8 since in Fig. 11 the cover housing 511 supports an arcuate guard 699 that partially envelopes offset portion 698 of the chain power wheel 614. This guard, having reference to Fig. 12, is discontinuous for the lower left hand quadrant portion of the power wheel to provide clearance for the brake release mechanism.

Herein also—see Fig. 11—between collar 555 and portion 554 is interposed an anti-friction device 697. Similarly between hub portion 523 and bearing portion 522 there is interposed an anti-friction device 696.

In this form of the invention the chain guard 617 instead of being superposed relative to the chain wheel is reversed relative thereto—see Fig.

12—and the power chain 616 passes between the supporting arms 618 thereof.

Herein inner shaft 524 is longitudinally bored as at 695 and the outer end thereof is threaded at 694 to receive a headless threaded closure 693. The opposite and closed end of the bore communicates by ducts 692 with the chamber 583. In this manner, lubrication can be supplied directly to the interior of the planetary system. This lubrication may differ, if desired, from that supplied to the other and associated parts by the fitting 606.

The major improvement, however, is in that portion of the invention which is interposed between the power transmitting and brake actuating pawl 619 and the brake operating shaft 544 and the adjacent cooperating parts carried thereby.

In this form of the invention—see Fig. 12—pawl 619 includes the tooth portion 632 relieved as at 633 for the purpose described. Pawl 619 is pivotally supported at 621 on the offset bracket 632*a* secured at 623 to the power wheel portion 614. Pawl 619 includes tooth 620 and the adjacent end of the pawl is squared as at 620*a*. Spring 640 normally constrains the pawl into ratchet tooth engagement.

The housing 511 at 511*a*—see Fig. 12—includes a stop portion, the purpose of which will be set forth hereinafter. The lever portion 625 carried by the free end of brake releasing shaft 544—see Figs. 11 and 12—mounts the spring pressed plunger 629 so formed on its projecting portion that when engaged by portion 633 of the pawl in counterclockwise rotation of the power wheel, the plunger is forced inwardly into the socket in said arm 625.

Upon reverse rotation of the power wheel for load lowering and brake release, tooth 632 engages the projecting face of plunger 629—see Fig. 12—and continued rotation of the power wheel tilts lever 625 to rock shaft 544 to secure brake release in the manner previously described herein. The resistance to such tilting tilts pawl 619 until in the continued rotation of the power wheel, portion 620*a* of the pawl engages stop 511*a* and further reverse rotation is prevented. This stop engagement prevents shearing or breaking off of the projecting end of the plunger 629.

While the invention has been described and illustrated in great detail in the foregoing description and drawings, the same is for example only and not in sense restrictive in character.

The several modifications illustrated and described, as well as others which will readily suggest themselves to persons skilled in this art, are all considered to be within the broad scope of the invention, reference being had to the appended claims.

The invention claimed is:

1. In a reversing hoist, a handle, a ratchet engageable pawl pivotally supported on the handle, an arm carried by the pawl, a lever operable rod for tilting the arm for pawl movement, a longitudinally movable hoist control member carried by the handle and bodily movable parallel to the pivotal axes of the pawl and handle, means opposing rod tilting of the pawl, a tiltable lever carried by the member and associated with the arm for tilting said lever and securing longitudinal movement of the member, and means opposing the effect of the first mentioned means and associated with the member.

2. In a hoist structure, the combination of a power operable shaft, a load chain engageable sprocket thereon, a planetary transmission including a sun gear, planetary pinions, a carrier therefor rigid with the shaft, a ring gear, the pinions being revolvable about the sun gear in the rotation of the power shaft when the sun gear is rotatable therewith, a supplementary shaft rigid with the sun gear, a brake drum also rigid therewith, a housing enclosing all of the aforesaid, a brake band for the brake drum normally constrained to lock the sun gear shaft to the housing, a ratchet mechanism operatively associated with the ring gear of the planetary system, and pawl means normally constrained to ratchet engagement and when engaged permitting power shaft and ratchet rotation in load elevating direction without sun gear rotation, said pawl means when disengaged from the ratchet permitting sun gear rotation with power shaft rotation in the load lowering direction upon removal of brake band constraint.

3. A device as defined by claim 2, characterized by the addition of a speed governor including centrifugally operable means rotatable with and by the sun gear auxiliary shaft and rotation retarding means operatively engaging the housing for retarding the sun gear auxiliary shaft, power shaft and brake drum rotation in load lowering direction upon predetermined speed thereof in load lowering direction.

4. In a hoist structure, the combination of a power shaft having a channel extending therethrough, means closing one end of said shaft, a power member for rotating said shaft and detachably associated therewith and retained in associated relation by said closing means, a planetary transmission including a sun gear, sun gear shaft, planetary pinions, a ring gear and a pinion support, the ring gear having a chamber formation for nesting the planetary pinions and sun gear, the power shaft extending into said chamber and having operative connection with the pinion support for rotation of the pinions with and by the power shaft, said passage communicating with said chamber, and closure means interposed between the sun gear shaft and the ring gear for retaining lubricant in said chamber.

5. In a hoist, the combination of a power shaft and load elevating means thereon, a handle having a pawl and engaging a ratchet operatively connected with said shaft, a brake normally constrained to brake operation, a one-way clutch between the brake structure and the power shaft permitting shaft operation in load elevating direction without brake operation or movement, said clutch connecting said power shaft and brake for braking or holding of the power shaft when not power rotated, means in juxtaposition to the handle and engageable thereby and connected to the brake, said means operating the brake in opposition to the brake constraint to permit load lowering, and manually operable handle supported means permitting or preventing the last mentioned engagement as desired.

6. In a hoist including a ratchet, a power shaft, manual means for rotating the shaft in one direction, a pawl carried by the means for ratchet engagement and shaft rotation, a brake structure operatively associated with the shaft, and brake operating mechanism controlled by the means including a rock-shaft, an operating arm thereon, a lever for operating said arm to operate said brake, and other means carried by the first mentioned means and manually controlled thereby for lever engagement for brake operation.

7. In a hoist, the combination of a two-part housing, a power shaft therein and projecting therethrough, means coaxial with the power shaft for rotating the same and external of and to one side of said housing, said two-part housing providing a chamber therein, and a load chain sprocket in said chamber rotatable by and with said power shaft, a chambered extension on one of the housing parts, said last mentioned housing part including a partition from which the shaft extends, operating mechanism within said second mentioned chamber, a detachable closure for the latter, a well portion depending from the second mentioned chamber forming portion, and a closure for the well portion.

8. A device as defined by claim 7, characterized by the addition of an operating shaft having operating means within the well portion and projecting therefrom and toward the other housing portion, and a projecting portion on the other housing portion including a bearing for said well projecting shaft.

9. In a hoist, the combination of an elongated flexible, load elevating and lowering means, rotatable means for moving same, a power shaft for rotating said rotatable means, a planetary system operatively associated with the shaft, a ratchet directly associated with the planetary ring gear, a pawl normally constrained to ratchet engagement and permitting ring gear rotation in one direction and preventing reverse rotation thereof, means operable in opposition to the constraint for withdrawing the pawl from ratchet engagement to permit ring gear rotation in the reverse direction, and means normally arranged to prevent lateral movement of the last mentioned means on pawl release and capable of locking said means in pawl release position when intentionally moved thereto.

10. A hoist as defined by claim 9, characterized by the pawl and the ratchet teeth having complementary draft formations whereby the teeth are mutually self-locking in one direction, pawl tooth withdrawal from ratchet tooth engagement requiring initial rotation of the ratchet in ratcheting direction for freeing the pawl from ratchet locking association for subsequent rotation of the ratchet in the reverse direction.

11. A device as defined by claim 7, characterized by the addition of an operating shaft having operating means within the well portion and projecting therefrom and toward the other housing portion, a projecting portion on the other housing portion including a bearing for said well projecting shaft, and means operable by the coaxial means for operating said last mentioned operating shaft.

12. In a chain hoist including a pivotally mounted handle, a ratchet including power shaft, a chain sprocket rotatable by said shaft, a pawl carried by the handle for ratchet engagement and shaft and sprocket rotation in handle movement, a band including brake structure adapted for operative connection to the shaft and sprocket when tending to lower the load but normally inoperative upon the shaft and sprocket in load elevation, a second ratchet adapted for operative connection to the sprocket, a second pawl means normally constrained to second ratchet engagement and permitting second ratchet rotation in load elevation by the sprocket and preventing reverse sprocket rotation for load holding purposes, manually operable means for releasing the second mentioned pawl means from second ratchet engagement to permit reverse sprocket rotation in load lowering, and brake operating means controlled by the handle including a rockshaft, an operating arm thereon, a lever for operating said arm to release the band of said brake structure, and means carried by the handle and manually controlled thereby for lever operation for brake band release when the second mentioned pawl means has been released from second ratchet engagement to permit sprocket load lowering rotation.

13. In a chain hoist including a pivotally mounted handle, a ratchet including power shaft, a chain sprocket rotatable by said shaft, a pawl carried by the handle for ratchet engagement and shaft and sprocket rotation in handle movement, a band including brake structure adapted for operative connection to the shaft and sprocket when tending to lower the load but normally inoperative upon the shaft and sprocket in load elevation, a second ratchet adapted for operative connection to the sprocket, a second pawl means normally constrained to second ratchet engagement and permitting second ratchet rotation in load elevation by the sprocket and preventing reverse sprocket rotation for load holding purposes, manually operable means for releasing the second mentioned pawl means from second ratchet engagement to permit reverse sprocket rotation in load lowering, and brake operating means controlled by the handle including a rockshaft, an operating arm thereon, a lever for operating said arm to release the band of said brake structure, means carried by the handle and manually controlled thereby for lever operation for brake band release when the second mentioned pawl means has been released from scond ratchet engagement to permit sprocket load lowering rotation, a centrifugally operable speed governor, and a planetary structure, the brake structure and speed governor having an operative connection to the sprocket through said planetary structure whereby the load lowering sprocket speed is multiplied for governor speed operating purposes.

14. In a chain hoist including a pivotally mounted handle, a ratchet including power shaft, a chain sprocket rotatable by said shaft, a pawl carried by the handle for ratchet engagement and shaft and sprocket rotation in handle movement, a band including brake structure adapted for operative connection to the shaft and sprocket when tending to lower the load but normally inoperative upon the shaft and sprocket in load elevation, a second ratchet adapted for operative connection to the sprocket, a second pawl means normally constrained to second ratchet engagement and permitting second ratchet rotation in load elevation by the sprocket and preventing reverse sprocket rotation for load holding purposes, manually operable means for releasing the second mentioned pawl means from second ratchet engagement to permit reverse sprocket rotation in load lowering, and brake operating means controlled by the handle including a rockshaft, an operating arm thereon, a lever for operating said arm to release the band of said brake structure, and means carried by the handle and manually controlled thereby for lever operation for brake band release when the second mentioned pawl means has been released from second ratchet engagement to permit sprocket load lowering rotation, a centrifugally operable speed governor, and a planetary structure including a ring gear, the brake structure and speed governor having an operative connection to the sprocket through said planetary structure whereby the load lowering sprocket speed is multiplied for governor speed operating purposes, the ring gear of the planetary structure and the second mentioned ratchet being rigid with each other.

15. In a chain hoist including a pivotally mounted handle, a ratchet including power shaft, a chain sprocket rotatable by said shaft, a pawl carried by the handle for ratchet engagement and shaft and sprocket rotation in handle movement, a band including brake structure adapted for operative connection to the shaft and sprocket when tending to lower the load but normally inoperative upon the shaft and sprocket in load elevation, a second ratchet adapted for operative connection to the sprocket, a second pawl means normally constrained to second ratchet engagement and permitting second ratchet rotation in load elevation by the sprocket and preventing reverse sprocket rotation for load holding purposes, manually operable means for releasing the second mentioned pawl means from second ratchet engagement to permit reverse sprocket rotation in load lowering, and brake operating means controlled by the handle including a rockshaft, an operating arm thereon, a lever for operating said arm to release the band of said brake structure, and means carried by the handle and manually controlled thereby for lever operation for brake band release when the second mentioned pawl means has been released from second ratchet engagement to permit sprocket load lowering rotation, a centrifugally operable speed governor, and a planetary structure including a sun gear, the brake structure including a drum, said brake structure and speed governor having an operative connection to the sprocket through said planetary structure whereby the load lowering sprocket speed is multiplied for governor speed operating purposes, the sun gear of the planetary structure and the drum of the brake structure being rigid with each other.

16. In a chain hoist including a pivotally mounted handle, a ratchet including power shaft, a chain sprocket rotatable by said shaft, a pawl carried by the handle for ratchet engagement and shaft and sprocket rotation in handle movement, a band including brake structure adapted for operative connection to the shaft and sprocket when tending to lower the load but normally inoperative upon the shaft and sprocket in load elevation, a second ratchet adapted for operative connection to the sprocket, a second pawl means normally constrained to second ratchet engagement and permitting second ratchet rotation in load elevation by the sprocket and preventing reverse sprocket rotation for load holding purposes, manually operable means for releasing the second mentioned pawl means from second ratchet engagement to permit reverse sprocket rotation in load lowering, and brake operating means controlled by the handle including a rockshaft, an operating arm thereon, a lever for operating said arm to release the band of said brake structure, means carried by the handle and manually controlled thereby for lever operation for brake band release when the second mentioned pawl means has been released from second ratchet engagement to permit sprocket load lowering rotation, a centrifugally operable speed governor, and a planetary structure including a sun gear and a ring gear, the brake structure including a drum, said brake structure and speed governor having an operative connection to the sprocket through said planetary structure whereby the load lowering sprocket speed is multiplied for governor speed operating purposes, the ring gear of the planetary structure and the second mentioned ratchet being rigid with each other and the sun gear of the planetary structure and the drum of the brake structure being rigid with each other.

17. In a free-chain hoist, including a housing, a load chain depending therefrom, chain moving means within the housing including power shaft means having an end exposed exteriorly of the housing, a control mechanism operatively connected to said chain moving means for load lowering control and within the housing and including a control member projecting from the housing, a supplementary shaft means within the housing, a centrifugally operable governor structure within the housing and operatively interposed between said supplementary shaft means and said housing for variably engaging same and governing load lowering, a planetary system within the housing and operatively interposed between the supplementary shaft means and the housing and with a one-way clutch connection to the latter, said system operatively connecting said power shaft means and said supplementary shaft means, a power means on the housing exposed end of the power shaft means, and housing exposed means operatively associated with the power means for directly rotating said power shaft means in a load elevating direction, said planetary system in load lowering being effective through said governor structure for increasing the safety factor of the hoist.

FREDRICK W. COFFING.